Figure 1:
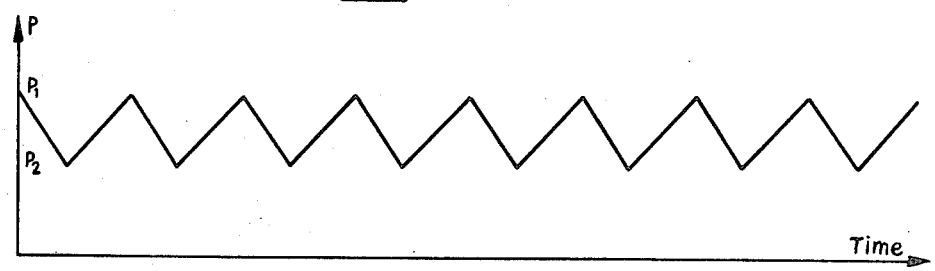

United States Patent [19]

Mancini et al.

[11] 3,714,123

[45] Jan. 30, 1973

[54] PROCESS FOR MAKING ETHYLENE POLYMERS OR COPOLYMERS IN A PRESSURE-PULSED TUBULAR REACTOR

[75] Inventors: Corrado Mancini; Raffaele Gaspari, both of Milan, Italy

[73] Assignee: Societa Italiana Resine S.p.A., Milan, Italy

[22] Filed: Dec. 7, 1970

[21] Appl. No.: 95,743

[52] U.S. Cl............260/63 R, 260/80.78, 260/86.7, 260/87.3, 260/87.5 C, 260/87.7, 260/88.1 R, 260/88.2 C, 260/94.9 R, 260/94.9 P
[51] Int. Cl..........C08f 1/60, C08f 3/04, C08f 15/00
[58] Field of Search......260/94.9 P, 94.9 R, 88.1, 63

[56] References Cited

UNITED STATES PATENTS 3,373,148  3/1968  Mackie et al...................260/94.9 P 2,852,501  9/1958  Richard, Jr. et al............260/94.9 R
3,294,773  12/1966  Gans et al.....................260/94.9 R
3,334,081  8/1967  Madgwick et al.................260/94.9

FOREIGN PATENTS OR APPLICATIONS 573,362  3/1959  Canada..........................260/94.9 R

*Primary Examiner*—Harry Wong, Jr.
*Assistant Examiner*—A. Holler
*Attorney*—Sughrue, Rothwell, Mion, Zinn & Macpeak

[57] ABSTRACT

Ethylene polymers or copolymers are produced in elongated reactors in which the pressure is pulsated in known manner by intermittent discharge but in which a constant partial discharge is maintained also, with the effect of improving control over reaction conditions.

13 Claims, 4 Drawing Figures

INVENTORS
CORRADO MANCINI
RAFFAELE GASPARI

BY Sughrue, Rothwell, Mion,
Zinn & Macpeak
ATTORNEYS

PROCESS FOR MAKING ETHYLENE POLYMERS OR COPOLYMERS IN A PRESSURE-PULSED TUBULAR REACTOR

The present invention relates to the manufacture of polyethylenes, or copolymers of ethylene with other polymerizable monomers, using the high pressure technique, and more precisely it relates to the controlling of the pressure in the tubular reactors, i.e. reactors with a high ratio of length to diameter.

Such processes are normally carried out at pressures in excess of approx. 1,000 kg/sq.cm. and at temperatures from 100° to 350° C, the ethylene, possibly mixed with other monomers, being fed continuously and together with reaction initiators consisting of substances capable of generating free radicals in the conditions under which polymerization is performed. Normally, peroxides are used as initiators and can be supplied at several points along the body of the tubular reactor.

The thermal effect of the reaction is also controlled by heat exchanger fluids situated outside the tubular reactor.

In the manufacture of ethylene polymers using the technique described it is extremely important to discharge the products of reaction, which must take place under conditions designed to avoid solid matter being deposited in the piping. Such deposits which accumulate in the course of time result in a steady diminution of the efficiency of heat exchange.

Thus it is difficult to control polymerization and the reaction fluid suffers decomposition.

In the prior art, the disadvantages described have been obviated by imparting to the reaction mixture a series of pulses at regular intervals of time so as to facilitate the expulsion of the products contained in the tubular reactor.

Such impulses are normally obtained by the total and rapid opening and closing of exit valves from the reactor at predetermined intervals of time.

Figure 2:
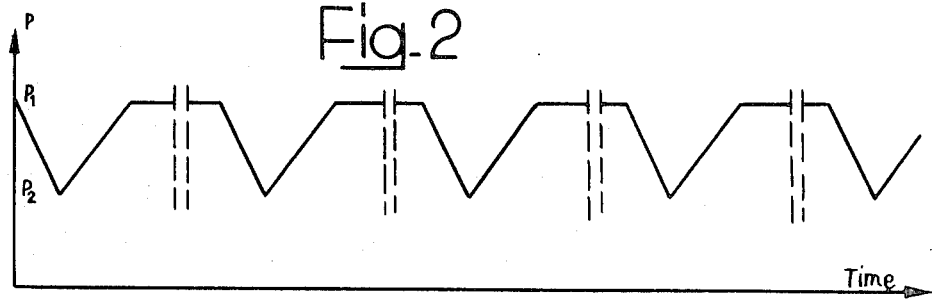

The pattern of pressure in the reactor as a function of time thus becomes typically sawtooth with rapid pulsations of pressure between maximum and minimum values. More particularly and referring to the attached FIG. 1, it is possible to have a simple sawtooth pattern with the pressure variable continuously between the maximum value $P_1$ and minimum value $P_2$, or it is possible to have the pattern shown in FIG. 2 in which, between one complete opening of the valve and the next, there is a more or less prolonged period during which the pressure is maintained virtually constant at its maximum value $P_2$.

This mode of operation is however not without its drawbacks. Thus, in processes in which the reaction initiators, normally in the form of solutions in organic solvent, are supplied at one or more points on the reactor, there may be phenomena where solution is drawn back into the reaction medium while the pressure is falling, with a consequent formation of zones which are richer in initiator.

Then, when the pressure is rapidly restored to its maximum, uncontrolled reaction conditions often occur, with consequent decompositions.

Such undesired phenomena are probably due to the variations in flow of constituents in the reactor, which prevent adequate homogenization with the initiator and also to the increase in temperature brought about by the rapid increase in pressure.

In the prior art, attempts have been made to obviate these disadvantages by adopting measures intended above all to ensure a constant supply of solution and initiator to the reaction medium.

However, this means that complex and expensive apparatus is required which does not always produce the desired results. Now it has been found possible to avoid the disadvantages of the prior art in the preparation of polymers or copolymers of ethylene in processes carried out in tubular reactors at high and pulsating pressures.

The process of the present invention is based substantially on the fact that uncontrolled reaction conditions are avoided when, in pulsation, the return of the pressure from its minimum to its maximum levels takes place relatively slowly.

It has been found that such conditions are achieved by means of a double discharge of contents in the reactor, in other words a first discharge which takes place continuously in time, over which is superimposed a second intermittent discharge which takes place periodically by pulsation of the pressure in the reactor. In other words, at the end of the reactor at which the reacted substance is expelled, an opening is made, the cross-section of which is maintained constant over the period of time, for the continuous discharge of the products of reaction.

Periodically superimposed on the continuous discharge is an intermittent discharge through a second cross-section by the rapid opening and closing of the discharge valve. The rapid opening and closing of the discharge valve is intended to mean that these operations take place in times of the order of a few tenths of a second.

These conditions can be achieved in various ways. Thus, for example, in a preferred embodiment, the position of the valve at the end of the reactor at which the products of reaction are discharged, is varied to a position of total opening and one of partial opening and vice versa. In other words, it is no longer necessary for the valve to have to close completely at any time.

In this case, it is useful to employ a positioner which determines the conditions of minimum opening of the valve.

According to another embodiment, the conditions of minimum opening may be achieved by appropriate shaping of the discharge valve; it is also possible to make two independent discharges, one of which is continuous while the other is intermittent.

Figure 3:
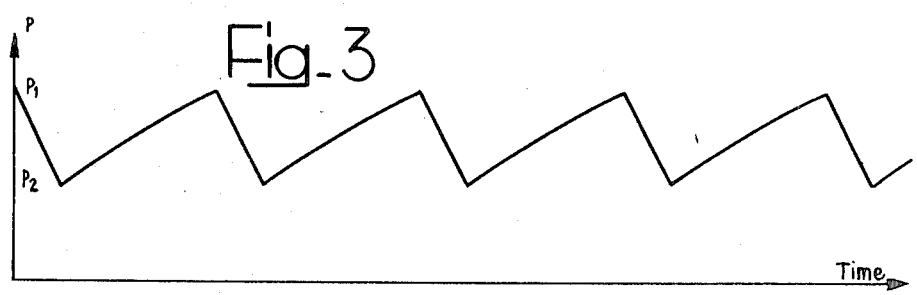
Figure 4:
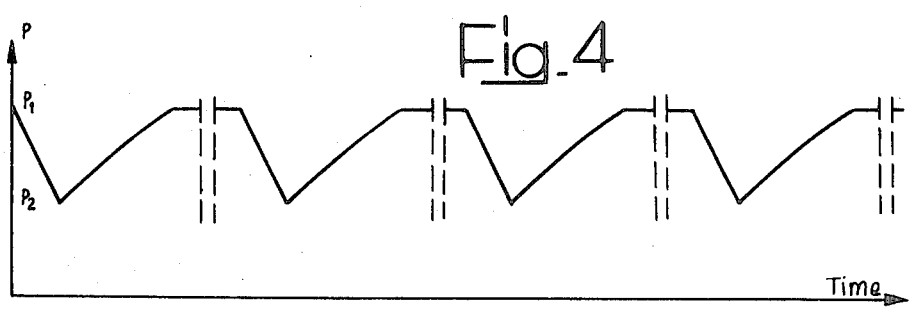

By proceeding under these conditions, the pattern of pressure as a function of time assumes the aspect shown in the FIGS. 3 and 4.

In particular, when the discharge valve is opened and closed rapidly, there is a rapid drop in pressure followed by a slow return to maximum value, generally in an asymptotic pattern.

In this way, uncontrollable reaction conditions are avoided simply and effectively by measures which make it possible moreover to conduct the manufacture of ethylene polymers in a conveniently economical manner, since expensive apparatus is avoided.

In carrying out the objects of the present invention, the ethylene, possibly containing other copolymerizable monomers, is supplied continuously to one end of a tubular reactor capable of withstanding pressure and having a ratio of length:diameter of 100:1 to 100,000:1.

Compounds having a terminal vinyl unsaturated group may be used as copolymerizable monomers. Examples which may be cited are: acrylic and methacrylic acids and their derivatives such as the esters of acrylic and methacrylic acids, for example the methyl, ethyl and stearyl esters. Other useful comonomers are vinyl chloride and vinylidine chloride and the vinyl carboxylates such as vinyl acetate and vinyl propionate.

It is possible also to mention styrene, alpha-chlorostyrene and vinyl naphthalene, together with the vinyl ethers such as vinyl methyl ether, vinyl butyl ether and the vinyl ketones, such as for example vinyl ethyl ketone.

Such comonomers are used up to a maximum quantity equal to approx. 35 mols per 100 mols of ethylene.

Polymerization is carried out at temperatures between 100° and 350° C and at pressures between 1,000 and 4,000 kg/sq.cm.

Useful initiators of copolymerization are those organic compounds which produce free radicals under conditions of reaction and preferably organic peroxides which, normally dissolved in organic solvents, are supplied at one or preferably more points along the tubular reactor.

The following may be used as organic peroxides: 2,4-dichlorobenzoyl peroxide, propionyl peroxide, caproyl peroxide, octanoyl peroxide, caprylyl peroxide, pelargonyl peroxide, isononanoyl peroxide, decanoyl peroxide, lauroyl peroxide, benzoyl peroxide, isopropyl peroxide-carbonate, tertiary butyl peracetate, tertiary butyl hydro-peroxide, tertiary butyl periso-octoate, dicumyl peroxide, methyl ethyl ketone peroxide, cyclohexanone peroxide, cumene hydroperoxide, ditertiary butyl peroxide and p-menthane hydroperoxide.

Such hydroperoxides are supplied in quantities of 5 to 500 mols per $10^6$ mols of polymerizable monomer.

The solvents for the initiators, useful for the purposes of the present invention, are the normally liquid aliphatic hydrocarbons such as hexane, heptane and cyclohexane, or the aromatic hydrocarbons such as benzene and toluene. It is also possible to use mixtures of aromatic hydrocarbons and aliphatic hydrocarbons.

In polymerization, chain transferers may be present, consisting for example of saturated aliphatic hydrocarbons such as: propane, butane, isobutane, pentane, hexane and heptane; alicyclic hydro-carbons such as cyclohexane, methyl cyclohexane, cyclopentane; aromatic hydrocarbons or chlorinated hydrocarbons.

Also the saturated aliphatic alcohols containing from one to six or more carbon atoms on the molecule may be used as chain transferers, particularly the primary and secondary alcohols such as for example: methanol, ethanol, propanol, n-butanol, pentanol, hexanol, isopropanol, isobutanol and secondary butanol.

These compounds are used in quantities of 0.2 to 6 mols per 100 mols of polymerizable monomer.

It is also possible to use as chain transferers, in the molar quantities quoted, aliphatic ketones such as for example acetone, diethyl ketone, diisobutyl ketone, methyl ethyl ketone, methyl isopropyl ketone and ethyl butyl ketone. For the same purposes, it is also possible to use the aldehydes such as for example: formaldehyde, acetaldehyde and n-valeraldehyde in quantities of 0.05 to 3 mols per 100 mols of polymerizable monomer.

Finally, unsaturated hydrocarbons such as: propylene, butene-1, butene-2, hexene-1, 3-methyl butene, octene-1, monene-1, decene-1, undecene-1 and dodecene-1, may be used as chain transferers and partial comonomers. Normally, such compounds are used in quantities of 0.1 to 4 mols for every 100 mols of polymerizable monomer.

As described previously, a fundamental aspect of the process of the present invention is the fact that the products are expelled by a pulsating discharge which is superimposed on a continuous discharge at the end of the reactor in which the products of reaction are discharged.

In particular, the pulsations are obtained by the rapid opening and closing of the discharge valve in the intermittent discharge section, controlling, by means of measures well known in the art, the effects of the irregular fluctuations in pressure due to various causes, so as to obtain pulsations of desired frequency and amplitude.

In particular, in the implementation of the object of the present invention, working in the field of pressures previously defined, the difference between the maximum pressure and minimum pressure of pulsations is desirably of the order of 100 to 500 kg/sq.cm. measured at the end of the reactor in which the ethylene is supplied, and preferably 150 to 450 kg/sq.cm., the cross-section of continuous discharge being at 5 to 30 percent and preferably 5 to 15 percent of the total maximum discharge cross-section provided when the intermittent discharge is superimposed.

Under such conditions, when a discharge valve opening frequency of 1 to 30 times per minute or preferably 3 to 15 or even more preferably from 4 to 8 times a minute is used, constant and easily controllable reaction conditions are achieved, avoiding undesired phenomena such as decompositions or formation of solid deposits on the walls of the reactor.

The pattern of pressures over a period of time thus assumes the aspect represented in FIGS. 3 or 4.

In particular, in FIG. 4, there is between one pulse and the next a lapse of time during which the pressure is maintained virtually at its maximum level.

It is obvious that the selection of one or other pattern will depend upon the time needed for the pressure to be returned from its minimum to its maximum level, in other words a factor which can easily be controlled, for example by a simple variation in the proportion between the cross-section of continuous discharge and that of intermittent discharge, while still remaining within the range of values as previously defined.

The following experimental examples will serve as further illustration of the invention, without however confining its scope in any way.

EXAMPLE 1

Ethylene polymerization was carried out in a pressure resistant tube having an inside diameter equal to 32 mm and a length equal to more than 700 m.

The tube was jacketed so that the thermal effects of reaction could be controlled by means of heat exchanger fluids. The apparatus also comprised means for introducing ethylene and catalytic mixture.

In particular, the ethylene was supplied completely at one end of the tubular reactor in quantities equal to approx. 17,000 kg/hr. while the catalytic mixture was supplied at two points situated respectively at a distance equal to 20 percent and 45 percent along the body of the reactor calculated from the end at which the ethylene was supplied.

The catalytic mixture used was a toluene solution of decanoyl peroxide and ditertiary butyl peroxide; these peroxides were supplied in quantities equal to 35 mols per $10^6$ mols of ethylene.

For this test, the pressure used was 2,450 kg/sq.cm., the temperature being 60° C at the point of ethylene intake, reaching 180° C at the first supply of initiator solution, after which the temperature reached two maxima respectively equal to 320° C and 305° C.

The temperature was regulated by means of pressurized water which was caused to circulate in the jacket enclosing the tubular reactor.

The chain transferer used was propylene supplied by vacuum to the secondary compressor and in quantities equal to 0.9 mols per 100 mols of ethylene.

In the reactor, a pulsating pressure was achieved by causing the reactor discharge valve to fluctuate from the position of total opening to a position of opening equal to 5 percent in respect of total opening.

In particular, throughout all the tests, a valve opening frequency of 4 times per minute was observed, with a difference between maximum pressure and minimum pressure of pulsations equal to 350 kg/sq. cm., measured at the end at which the ethylene was supplied. These conditions of operation were observed for 30 days and during this period of time no decomposition occurred. Furthermore, the ethylene was converted to polymer in quantities equal to 22 percent for each pass, and the polymer produced had the following characteristics: melt index = 2.10 g/10'; nominal density at 23° C = 0.921 g/cu.cm.; haze turbidity = 6 percent; surface brightness (gloss) = 66 percent.

EXAMPLE 2 (COMPARATIVE)

A procedure was adopted as in Example 1, but eliminating the continuous discharge and causing the discharge valve to pulse between the position of total opening and that of total closure 11 times per minute.

In this way, the difference between the maximum value in pulsations and minimum was equal to 250 kg/sq.cm.

These conditions were maintained for 24 hours and during that period there were three decompositions.

What we claim is:

1. A process for the manufacture of polyethylene or copolymers of ethylene containing up to 35 mol percent of other polymerizable monomers, by supplying monomers to one end of a tubular reactor having a proportion of length:diameter of 100:1 to 100,000:1 and proceeding at temperatures from 100° to 350° C, with pulsating pressures and at values comprised between 1,000 and 4,000 kg/sq.cm., and in the presence of peroxide initiators said initiators being laterally introduced as side streams in an organic solvent into said reactor through one or more positions on the reactor, at least one of said positions not being at said end, characterized in that the contents in the reactor, at the end at which the products of reaction are recovered, are discharged partly continuously through a discharge cross-section maintained constant over a period of time and partly intermittently through a rapidly opened and closed second discharge cross-section.

2. A process according to claim 1, characterized in that the continuous discharge cross-section is maintained at 5 to 30 percent of the total maximum cross-section of discharge which is provided when the intermittent discharge is superimposed, with a frequency of opening and closing of the second discharge cross-section of 1 to 30 times per minute, the difference between the maximum pressure and minimum pressure in pulsations being comprised between 100 and 500 kg/sq.cm., this pressure value being measured at the end of the reactor at which the polymerizable monomers are supplied.

3. A process according to claim 2, characterized in that the continuous discharge cross-section is maintained at 5 to 15 percent of the total.

4. A process according to claim 2, characterized in that the frequency of opening and closing is 3 to 15 times per minute.

5. A process according to claim 4, characterized in that the frequency is 4 to 8 times per minute.

6. A process according to claim 2, characterized in that the difference between the maximum pressure and the minimum pressure is 150 to 450 kg/sq.cm.

7. A process according to claim 1, characterized in that organic peroxides dissolved in an organic solvent selected from the group consisting of aliphatic hydrocarbons, aromatic hydrocarbons and mixtures thereof, are supplied to the polymerization reactor.

8. A process according to claim 1, characterized in that to the polymerization reactor are supplied from 5 to 500 mols of organic peroxides per $10^6$ mols of polymerizable monomers.

9. A process according to claim 7, characterized in that the said peroxides are chosen from: 2,4-dichloro benzoyl peroxide, propionyl peroxide, perlargonyl peroxide, caproyl peroxide, octanoyl peroxide, caprolyl peroxide, isononanoyl peroxide, decanoyl peroxide, lauroyl peroxide, benzoyl peroxide, isopropyl peroxide-carbonate, tertiary butyl peroxide, tertiary butyl peracetate, tertiary butyl hydroperoxide, tertiary butyl periso-octate; dicumyl peroxide, methyl ethyl ketone peroxide, cyclohexane peroxide, cumene hydroperoxide, ditertiary butyl peroxide and p-menthane hydroperoxide.

10. A process according to claim 1, characterized in that compounds with an unsaturated terminal vinyl group are used as comonomers for the ethylene.

11. A process according to claim 1, characterized in that to the polymerization reactor are supplied chain transferers consisting of aliphatic hydrocarbons, aliphatic alcohols or aliphatic ketones in quantities of 0.2 to 6 mols per 100 mols of polymerizable monomers, or aldehydes in quantities of 0.05 to 3 mols per 100 mols of polymerizable monomers.

12. In a process for the manufacture of polyethylene or copolymers of ethylene containing up to 35 mol percent of other polymerizable monomers, by supplying monomers to one end of a tubular reactor having a proportion of length:diameter of 100:1 to 100,000:1 and proceeding at temperatures from 100° to 350°C, and in the presence of peroxide initiators, said initiators being introduced into said reactor through one or more positions on the reactor, at least one of said positions not being at said end, with pulsating pressures and at values comprised between 1,000 and 4,000 kg./sq. cm., the improvement which comprises discharging the products of the reaction partly continuously through a discharge cross-section maintained constant over a period of time and partly intermittently to a rapidly opened and closed second discharge cross-section.

13. A process for the manufacture of polyethylene of copolymers of ethylene containing up to 35 mol. percent of other polymerizable monomers, by supplying monomers to one end of a tubular reactor having a proportion of length:diameter of 100:1 to 100,000:1 and proceeding at temperatures from 100° to 350° C, with pulsating pressures and at values comprised between 1,000 and 4,000 kg/sq.cm., and in the presence of peroxide initiators, being laterally introduced as side streams in an organic solvent into said reactor through one or more positions on the reactor, at least one of said positions not being at said end, characterized in that the contents in the reactor at the end which the products of the reaction are recovered, are discharged partly continuously through a continuous discharge cross-section maintained constant over a period of time and partly intermittently through an intermittent discharge rapidly opened and closed second discharge cross-section, said continuous discharge cross-section being maintained at 5 to 30 percent of the total maximum cross-section of discharge which is provided when the intermittent discharge is superimposed, with a frequency of opening and closing of said second discharge cross-section of 1 to 30 times per minute, the difference between the maximum pressure and minimum pressure in pulsations being between 100 and 500 kg/sq.cm., this pressure value being measured at the end of the reactor at which the polymerizable monomers are supplied.

* * * * *

UNITED STATES PATENT OFFICE
CERTIFICATE OF CORRECTION

Patent No. 3,714,123　　　　　　　　　Dated January 30, 1973

Inventor(s) Corrado Mancini et al

It is certified that error appears in the above-identified patent and that said Letters Patent are hereby corrected as shown below:

In The Heading:

The Priority Date was omitted. Should read:

--Italy　　　　　　　　　December 23, 1969.......26201-A/69--

Signed and sealed this 3rd day of July 1973.

(SEAL)
Attest:

EDWARD M. FLETCHER, JR.　　　　　Rene Tegtmeyer
Attesting Officer　　　　　　　　Acting Commissioner of Patents